United States Patent [19]

Bornack, Jr. et al.

[11] Patent Number: 4,810,747
[45] Date of Patent: Mar. 7, 1989

[54] WATER DISPERSIBLE POLYAMIDE BLEND

[75] Inventors: Walter K. Bornack, Jr., Amherst, N.Y.; Keith R. McNally, Bedminster, N.J.

[73] Assignee: NL Chemicals, Inc., New York, N.Y.

[21] Appl. No.: 152,904

[22] Filed: Feb. 5, 1988

[51] Int. Cl.$^4$ .................. C08L 77/08; C08L 77/06
[52] U.S. Cl. .................. 524/538; 525/420.5; 525/432
[58] Field of Search .............. 524/538; 525/420.5, 525/432

[56] References Cited

U.S. PATENT DOCUMENTS

| | | | |
|---|---|---|---|
| 3,776,865 | 12/1973 | Glaser et al. | 260/18 |
| 3,778,394 | 12/1973 | Lovald et al. | 260/18 |
| 4,514,540 | 4/1985 | Peck | 524/514 |
| 4,683,262 | 7/1987 | Whyzmuzis et al. | 524/608 |
| 4,698,396 | 10/1987 | Drawert et al. | 525/420.5 |

FOREIGN PATENT DOCUMENTS 88067  5/1985  Japan ..................... 524/538

*Primary Examiner*—John C. Bleutge
*Assistant Examiner*—David W. Woodward
*Attorney, Agent, or Firm*—Michael L. Dunn; Ellen K. Park

[57] ABSTRACT

The present invention comprises a blend of two polyamide resins (first and second). The first resin comprises dibasic derivatives of fatty acids, monobasic acid and organic polyamines. The second resin comprises isophthalic acid, dibasic derivatives of fatty acids and organic polyamines. The combination of the first and second resins in proportional amounts results in a water dispersible polyamide blend which exhibits good blocking and release properties as well as improved water dispersibility and pigment wetting. This blend is useful in flexographic ink compositions as well as Cold Seal Release Lacquer formulations.

20 Claims, No Drawings

WATER DISPERSIBLE POLYAMIDE BLEND

BACKGROUND OF THE INVENTION

There are a large variety of inks which are available for use on surfaces, such as metal, fabrics, wood, glass or plastics. Inks in general consist of a vehicle, or carrying agent, and a colorant that is evenly dispersed throughout the vehicle. One particular example of a type of ink is flexographic inks (formerly named aniline inks) which are used on presses with rubber printing plates. Flexographic inks are being used increasingly, especially for package wrappings such as foils, transparent plastic films, or paper-bag machines. They are generally composed of volatile solvents such as low boiling point alcohols, esters, aliphatic and aromatic hydrocarbons, ketones and water.

The most widely used family of flexographic inks are formulated from polyamide resins. Polyamides are formed by combining carboxylic acids, mostly dibasic, with organic polyamines, usually diamines. The acid and amine groups immediately react to form a salt. Upon heating to 140° C. or higher, this salt decomposes with the evolution of water to give an amide bond.

Alcohol soluble polyamides are widely used in alcohol based flexographic inks for printing on plastic film. Environmental concern over the amounts of volatile organic solvents in the atmosphere has led to a desire to use aqueous solutions that have less volatile organic solvents contained therein. In order to meet new Environmental Protection Agency regulations, it is desirable to employ water based flexographic inks with reduced levels of volatile organic solvents. In order to accommodate the reduced levels of volatile organic solvents, the polyamide resins used should have increased water solubility and yet retain other desirable properties of polyamide resins. The major technological difficulty has been in making water dispersible (WD) polyamides which provide inks with good properties such as adhesion, gloss, water resistance, and blocking resistance.

To achieve water dispersibility, it is necessary that the polyamide have a high acid value (AV) in the range of 50-100. When the free acid groups of the resin are neutralized with ammonia, it becomes water soluble. After printing, the ammonia evaporates and the resin develops water resistance.

Making a high AV polyamide using standard synthetic methods presents no problem. It is simply a matter of using a large excess of carboxylic acid over amine in the formulation. The difficulty is that polymer molecular weight is inversely proportional to AV. Therefore, if standard synthetic methods are used, WD polyamides with AV=50-100 are much lower in molecular weight than conventional alcohol soluble polyamides, which usually have acid values of less than 10. This lower molecular weight results in soft, sticky resins with degraded performance. Therefore, the problem is synthesizing polyamides with both high AV and good hardness.

Polyamides which are rendered water dispersible have been described in the prior art literature:

U.S. Pat. No. 3,776,865 to Glaser and Lovald discloses polyamide resins obtained by reacting an acid component comprised of a polymeric fat acid and another dicarboxylic acid with an amine component comprising isophorone diamine or mixtures thereof with an alkylene diamine. At least 12.5 carboxyl equivalent percent of the polymeric fat acid is employed. The patentees disclose that these resins are useful as binders applied by aqueous systems, particularly in flexographic/gravure inks where water reducibility is desired.

U.S. Pat. No. 3,778,394 to Lovald and Glaser discloses that the acid used to make the water dispersible polyamide is largely composed of a rosin acid-carboxylic acid adduct.

U.S. Pat. No. 4,514,540 to Peck, discloses that included in the starting materials of the water dispersible polyamide is a preformed synthetic resin having carboxyl and/or hydroxyl groups.

U.S. Pat. No. 4,683,262 to Whyzmuzis and Menke discloses a method where little or no polymeric fatty acids are used to make the polyamide.

In spite of the wide variety of polyamide containing water dispersible compositions known through the prior art descriptions, there remains a need for improved polyamide compositions which are water dispersible and yet retain adhesion, gloss, water resistance and blocking resistance properties, characteristic of traditional alcohol soluble polyamides.

Polyamides can also be utilized in Cold Seal Release Lacquers which are used in packaging. Cold Seal Release Lacquers (CSRL) were originally developed for the candy bar/chocolate market. Cold seal technology has now expanded into the high growth flexible snack-food packaging industry. Cold Seal Release Lacquers are generally a polyamide or nitrocellulose/polyamide blend system designed to act as a protective coating for the printed side of a film package. The CSRL must provide gloss and scuff protection to the finished product as well as being block resistant while the printed film is in roll form. High wind-up tension within the printed roll makes the CSRL/Cohesive interface critical. If the CSRL does not provide a smooth, easy unwind, ink picking, film tearing or difficult machining will occur.

SUMMARY OF THE INVENTION

The present invention comprises a water dispersible polyamide composition wherein good blocking and release properties as well as improved water dispersibility and pigment wetting can be achieved. More particularly, the invention comprises a blend of two types of polyamide resins (a first resin and a second resin) which in combination exhibit the above desirable characteristics and are useful in flexographic inks and cold seal release lacquer formulations. The first resin comprises the reaction product of dibasic derivatives of fatty acids, monobasic acid and organic polyamines and has an acid value of from 20 to 50. The second resin comprises isophthalic acid (IPA), dibasic derivatives of fatty acids and organic polyamines and has an acid value of from 50 to 120.

DETAILED DESCRIPTION OF THE INVENTION

The present invention relates to polyamides and more particularly to polyamides which are rendered water dispersible and useful as components in water based inks and lacquers. Two distinct types of water dispersible (WD) polyamides are disclosed. Each type of resin by itself lacks certain properties essential for a usable ink or lacquer component. However, when blended in approximately equal amounts, these resins form a system with significantly improved properties which can be used in water-based flexographic inks and cold seal release lacquers (CSRL's).

Polyamides in general are formed by combining carboxylic acids with organic polyamines. Polyamines employed in the present invention are organic amines having polyamine functionality and handling properties such as appropriate viscosity to permit use in accordance with the present invention. Especially suitable are one or more of the aliphatic or cycloaliphatic diamines such as those of the formula:

$$H_2N-R'-NH_2$$

wherein R' is an aliphatic or cycloaliphatic hydrocarbon radical. Preferred diamines are hexamethylene diamine (HMDA), m-xylene diamine (MXDA), 1,2-diaminocyclohexane (DCH), isophorone diamine (IPDA) and ethylene diamine (EDA).

The carboxylic acids may be either monobasic or dibasic. Monobasic as used in the art are acids having one displaceable hydrogen atom per molecule. Dibasic as used in the art are acids having two displaceable hydrogen atoms per molecule. Examples of monobasic acids which may be used are propionic acid and acetic acid. Examples of dibasic acids which may be used are dimer acids, isophthalic acid (IPA) and Westvaco Diacid 1550. Westvaco Diacid 1550 (WV 1550) is a dibasic adduct of acrylic acid and a fatty acid and is essentially 2-n-hexyl-5-(7-carboxyl-n-heptyl)-cyclohex-3-ene carboxylic acid. Dimer acid as used herein is defined as a complex mixture resulting from the polymerization of fatty acids. Representative of these are those that are commercially available from the polymerization of tall oil fatty acids. These have a typical composition as follows:

|  | % by weight |
| --- | --- |
| $C_{18}$ monobasic acids (monomer) | 0–5 |
| $C_{36}$ dibasic acids (dimer) | 60–95 |
| $C_{54}$ and higher polybasic acids (trimer) | 1–35 |

The relative ratios of monomer, dimer and trimer are dependent on the nature of the starting material and the conditions of polymerization. The preferred compositions for the present invention are those that comprise about 82% dimer and 18% trimer.

One type of WD polyamide, the first resin, closely resembles conventional alcohol soluble polyamides in that the major raw materials are dimerized fatty acid (dimer acid), propionic acid, and ethylene diamine (EDA). Small amounts of other diacids and diamines are included to enhance properties. General compositions of the first resins include dibasic derivatives of fatty acids, monobasic acid and organic polyamines. Examples of the polyamines which may be used in the first resin are any one or more of those listed above. Examples of monobasic acid which may be used are acetic acid and propionic acid. Acid value (AV) is the major difference between the first resins (AV=30–50) of the present invention and conventional alcohol soluble polyamides (AV<5). Acid value as defined in the art is the number of milligrams of potassium hydroxide required to neutralize the free acids present in 1 gram of resin. High AV is the source of water dispersibility. When neutralized with ammonia, the acid groups impart water solubility. The first resins have good release properties in cold seal release lacquers (CSRL's) and good blocking properties in both CSRL's and flexographic inks.

The major defect of the first resins however is that they have limited water dispersibility. Solutions of the first resins cannot accept enough water to get down to the Environmental Protection Agency compliance ratio of 80:20 water:alcohol by weight. An acid value of 50 or less does not impart adequate water solubility. The first resins with higher AV's are unacceptably soft and sticky. A second defect of the first resins is their inability to wet pigment. Good pigment wetting is essential for an ink resin.

The first resins were developed initially at Victor Wolf Ltd. in England during 1985, E-2072 is one example. There are improved versions of the first resin E-2072, these first resins are EA-5713 and EA-5803, (compositions are listed hereunder in Table I).

The second type of polyamide is designated as the second resin. The general composition of the second resins include IPA, dibasic derivatives of fatty acids and organic polyamines. These second resins differ from the first resins in several ways. The second resins have higher AV's of about 50–120. This gives the second resins much better water dispersibility. The second resins contain high levels of isophthalic acid (IPA), about 30–60 carboxyl equivalent percent, while the first resins contain none. This high IPA content is needed to obtain hard, non-sticky resin at these high AV's. Finally, the second resins contain no monofunctional raw materials such as propionic acid. This further enhances water dispersibility by insuring that each polymer molecule bears two free carboxyl groups.

The high IPA content diminishes resin solubility in both alcohol and alcohol/water mixtures. This lost solubility can be regained by incorporating into the polyamide high levels of diamines other than EDA. These diamines include but are not limited to hexamethylene diamine (HMDA), m-xylene diamine (MXDA), 1,2-diaminocyclohexane (DCH), isophorone diamine (IPDA) and 2-methyl-pentamethylene diamine. At least 40 amine equivalent percent of one of these non-EDA diamines is necessary to obtain good alcohol solubility.

The second polyamide resins have excellent water reducibility and wet pigment well. However, they do not have good blocking or release properties. Therefore, used by themselves, they do not give good inks or CSRL's. Examples of the second resins which have given acceptable results are EA-5614 and EA-5649 (compositions are listed hereunder in Table II).

It is disclosed in the present invention that a blend of polyamides results in a water dispersible product which may be used in water based flexographic inks and Cold Seal Release Lacquers. These blends have properties desirable for use as discussed above. The blend contains a first resin which comprises about 60–90 carboxyl equivalent percent dibasic derivatives of fatty acids; about 10–40 carboxyl equivalent percent of monobasic acid; and organic polyamines. The blend also contains a second resin which comprises about 30–60 carboxyl equivalent of IPA; about 35–70 carboxyl equivalent of dibasic derivatives of fatty acids; and organic polyamines.

It is disclosed in this present invention that blending of the first polyamides with the second polyamides in approximately equal amounts gives a product which is usable in the manner discussed above. This is a novel composition of polyamides. Two component polyamide systems have not been used in this field. In addition, the second resins are not frequently used in ink or CSRL formulations. The first polyamide gives the blend good blocking and release properties while the second polyamide improves water dispersibility and pigment wetting. Thus the two types combined give a usable system while by itself each type is inadequate.

In the preparation of the polyamide composition of the invention, the reaction mixtures may also include a variety of inert, non-reactive ingredients, such as antioxidants, acidic catalysts, antifoam agents and the like. In addition, small amounts of other low molecular weight dibasic acids, such as adipic acid, may be included.

The following descriptions of the invention are not intended to be limiting in any manner, they are merely illustrative. Various modifications, applications and changes may occur to those skilled in the art without departing from the true spirit and scope of the invention.

PREFERRED EMBODIMENTS

First Resin Synthesis

The apparatus is a 5-liter flask with a mechanical stirrer, nitrogen inlet, thermometer and water trap. Dimer acid (1081 grams) and propionic acid (206 grams) are charged to the flask along with a trace of silicone antifoam. The mixture is heated to 120° C. and a solution of IPDA (138 grams) and EDA (225 grams) is added slowly so that the temperature remains below 130° C. The mixture is then heated to 180° C. Westvaco 1550 (855 grams) is then added. The resin is then heated to 200° C. This temperature is maintained until the amine value is less than 5, after which the resin is discharged. Amine value as used in the art is defined as the milligrams of potassium hydroxide equivalent to the free amine groups in 1 gram of the polyamide resin so it is analogous to AV.

The product resin typically has the following properties:

AV: 40
AmV: 4
Softening Point: 120° C.

and is designated herein as EA-5803. This example is essentially repeated except that percentages of components are varied. Preferred resulting first resins are shown in Table I. Softening point as used herein is Ring and Ball (R & B) softening point.

Second Resin Synthesis

The apparatus is a 5-liter flask equipped with a mechanical stirrer, a nitrogen inlet, a thermometer and a water trap. Dimer acid (894 grams), Westvaco 1550 (375 grams), and xylene (250 g) are charged along with traces of phosphoric acid catalyst (70 ppm) and silicone antifoam (1 ppm). The mixture is heated to 70° C. and isophthalic acid (560 g) and adipic acid (44.8 g) are added. The mixture is then heated to 120° C. and a solution of MXDA (492 g) and IPDA (135 g) is slowly added so that the temperature remains below 130° C. After the amine addition is complete, the mixture is stirred at 120°–130° C. for 15 minutes, then heated to 250° C. distilling off xylene and the water of reaction. The resin is stirred at 250° C. until the amine value is below 1, then it is discharged.

The product resin typically has the following properties:

Acid Value: 80.0
Amine Value: 0.5
Softening Point (R & B): 115° C.
Solution Viscosity (60% NV in-propanol): 25P Neutralization of the 60% nonvolatile (NV) n-propanol solution with ammonia and dilution with water to 30% NV gives a clear solution with a viscosity of 12P (Poise).

The product resin of the above second resin synthesis is designated herein as EA-5649. This example is essentially repeated except that percentages of components are varied. Preferred resulting second resins are shown in Table II.

Resin Utilization

Resin Solution Formation

Mixtures of the resins are made into aqueous solutions in the following manner. Water (52 grams), n-propanol (22 grams), ammonium hydroxide (1.4 grams) and total resin (25 grams) are charged into a blender and mixed until a clear, particle free solution is obtained. This usually occurs within 15 minutes. The pH is then adjusted to 8.2–8.9 with ammonium hydroxide.

Water Based CSRL Formulation

To form a CSRL, the following ingredients are blended: resin solution (70 grams), wax emulsions (7 grams), water (23 grams). This formulation gives an EPA compliant solvent blend of 80.4/19.6 water/n-propanol by weight.

Typical cohesive release values for different ratios of first resin to second resin in the resin solution are listed below. The results were obtained by placing CSRL coated polypropylene in contact with adhesive coated polypropylene for 16 hours at 120° F.

| First Resin (EA-5803) | Second Resin (EA-5614) | Release Value (grams/inch) |
|---|---|---|
| 0% | 100% | 250 |
| 50% | 50% | 65 |
| 60% | 40% | 60 |
| 70% | 30% | 55 |
| 30% | 70% | 225 |

Water Based Flexographic Ink Formulation

The resin solutions are used to formulate flexographic inks by mixing the following components: resin solution (54 grams), organic pigment dispersion (28 grams), isopropanol (1 gram), water (17 grams). This formulation gives an ink with an EPA compliant solvent blend of 81/19 water/alcohol by weight.

Prints made with a hand proofer on polyethylene and polypropylene film have gloss and adhesion similar to inks made with alcohol soluble polyamides. Print blocking resistance is acceptable if a 50/50 first resin (EA-5803)/second resin (EA-5614) blend of resin solutions is used. Blocking resistance is poor if straight second resin solution is used.

TABLE I

Preferred Compositions
A. First Polyamide Resins

| | E-2072 | | | EA-5713 | | | EA-5803 | | |
|---|---|---|---|---|---|---|---|---|---|
| | Wt. % | Total Eq. % | Carboxyl Eq. % | Wt. % | Total Eq. % | Eq. % | Wt. % | Total Eq. % | Eq. % |
| | | | | | | Carboxyl | | | Carboxyl |
| Dimer acid | 80.04 | 38.04 | 70.80 | 47.04 | 21.81 | 39.11 | 43.25 | 18.86 | 34.75 |
| WV 1550 | — | — | — | 32.92 | 21.81 | 39.11 | 34.01 | 21.27 | 39.19 |
| Propionic Acid | 8.40 | 15.71 | 29.20 | 6.64 | 12.14 | 21.78 | 8.23 | 14.15 | 26.06 |
| | | | | | | Amine | | | Amine |
| HMDA | 2.92 | 6.99 | 17.83 | | | | | | |
| IPDA | — | — | — | 5.32 | 8.47 | 19.15 | 5.51 | 8.25 | 18.04 |
| EDA | 8.64 | 39.26 | 82.17 | 8.08 | 35.77 | 80.85 | 9.00 | 37.47 | 81.96 |

TABLE II

B. Second Polyamide Resins

| | EA-5649 | | | EA-5614 | | | 2401-13 WB | | | 2401-29 WB | | |
|---|---|---|---|---|---|---|---|---|---|---|---|---|
| | Wt. % | Total Eq. % | Eq. % | Wt. % | Total Eq. % | Eq. % | Wt. % | Total Eq. % | Eq. % | Wt. % | Total Eq. % | Eq. % |
| | | | Carboxyl | | | Carboxyl | | | Carboxyl | | | Carboxyl |
| Dimer acid | 35.75 | 14.50 | 24.95 | 34.74 | 13.88 | 24.98 | 40.30 | 19.77 | 35.00 | 62.40 | 25.71 | 45.00 |
| WV 1550 | 15.00 | 8.73 | 15.02 | 14.56 | 8.32 | 14.97 | 28.21 | 19.77 | 35.00 | — | — | — |
| IPA | 22.39 | 31.97 | 55.02 | 21.76 | 30.56 | 55.01 | 9.84 | 16.95 | 30.00 | 21.68 | 31.44 | 55.00 |
| Adipic Acid | 1.79 | 2.91 | 5.01 | 1.74 | 2.80 | 5.04 | | | | | | |
| | | | Amine | | | Amine | | | Amine | | | Amine |
| IPDA | 5.40 | 7.55 | 18.02 | 6.14 | 8.40 | 18.90 | 4.70 | 7.91 | 18.18 | — | — | — |
| MXDA | 19.67 | 34.34 | 81.98 | 21.05 | 36.04 | 81.10 | 16.95 | 35.60 | 81.82 | — | — | — |
| HMDA | — | — | — | — | — | — | — | — | — | 9.40 | 17.14 | 40.00 |
| EDA | — | — | — | — | — | — | — | — | — | 6.52 | 25.71 | 60.00 |

What is claimed is:

1. A water dispersible polyamide composition comprising:
   a first resin, comprising the reaction product of dibasic derivatives of fatty acids, monobasic acid and organic polyamines, said first resin having an acid value of from about 20 to 50; and
   a second resin different than the first resin, comprising the reaction product of IPA (isophthalic acid), dibasic derivatives of fatty acids and organic polyamines, said second resin having an acid value of from about 50 to 120.

2. The composition of claim 1 comprising:
   A first resin comprising:
   (a) about 60–90 carboxyl equivalent percent dibasic derivatives of fatty acids.
   (b) about 10–40 carboxyl equivalent percent of monobasic acid.
   (c) Organic polyamines in sufficient quantities to give an acid value of about 20–50 in the finished resin; and
   A second resin comprising:
   (a) about 30–60 carboxyl equivalent percent of IPA (isophthalic acid).
   (b) about 35–70 carboxyl equivalent percent of dibasic derivatives of fatty acids.
   (c) Organic polyamines in sufficient amounts to give an acid value of about 50–120 in the finished resin.

3. The composition of claim 2 wherein the organic polyamines of said first or said second resin or both are diamines.

4. The composition of claim 3 wherein the diamine of the second resin comprises at least one of IPDA (isophorone diamine), MXDA (m-xylene diamine), HMDA (hexamethylene diamine) or EDA (ethylene diamine).

5. The composition of claim 2 wherein the polyamines of the second resin are diamines and the maximum content of EDA (ethylene diamine) is about 60 amine equivalent percent.

6. The composition of claim 4 wherein the diamine is MXDA (m-xylene diamine).

7. The composition of claim 2 wherein the weight ratio of the first resin to the second resin is from 20:80 to 80:20.

8. A lacquer formulation comprising the composition of claim 2.

9. A water based Cold Seal Release Lacquer formulation comprising the composition of claim 2.

10. An ink formulation comprising the composition of claim 2.

11. A flexographic ink formulation comprising the composition of claim 2.

12. The composition of claim 2 having good blocking the release properties, good water dispersibility and good pigment wetting properties.

13. The composition of claim 2 wherein said dibasic derivative of fatty acid of said first resin or said second resin comprises at least one of Dimer acid, or 2-n-hexyl-5-(7-carboxyl-n-heptyl)-cyclohex-3-ene carboxylic acid.

14. The composition of claim 2 wherein the monobasic acid is propionic acid.

15. The composition of claim 2 wherein the monobasic acid is acetic acid.

16. An aqueous dispersion comprising the polyamide composition of claim 1.

17. An aqueous dispersion comprising the composition of claim 2.

18. An aqueous dispersion comprising the composition of claim 7.

19. The composition of claim 3 wherein the diamine of the first resin comprises at least one of IPDA (isophorone diamine), HMDA (hexamethylene diamine) or EDA (ethylene diamine).

20. The composition of claim 19 wherein the diamine of the second resin comprises at least one of IPDA (isophorone diamine), MXDA (m-xylene diamine), HMDA (hexamethylene diamine) or EDA (ethylene diamine).

* * * * *

UNITED STATES PATENT AND TRADEMARK OFFICE
CERTIFICATE OF CORRECTION

PATENT NO. : 4,810,747
DATED : March 7, 1989
INVENTOR(S) : Walter K. Bornack, Jr., et al It is certified that error appears in the above-identified patent and that said Letters Patent is hereby corrected as shown below:

Claim 12, column 8, line 44, "the" should read --and--.

Signed and Sealed this

Twenty-ninth Day of August, 1989

Attest:

DONALD J. QUIGG

Attesting Officer

Commissioner of Patents and Trademarks